Nov. 12, 1968 P. HINI 3,410,721

GALVANO-MAGNETIC RESISTOR WITH SEMICONDUCTOR TOP LAYER

Filed Sept. 10, 1965

United States Patent Office 3,410,721
Patented Nov. 12, 1968

3,410,721

GALVANO-MAGNETIC RESISTOR WITH SEMICONDUCTOR TOP LAYER

Paul Hini, Erlangen, Germany, assignor to Siemens Aktiengesellschaft, a corporation of Germany Filed Sept. 10, 1965, Ser. No. 486,288
Claims priority, application Germany, Sept. 10, 1964, S 93,079
6 Claims. (Cl. 117—218)

ABSTRACT OF THE DISCLOSURE

Described is a galvano-magnetic resistor comprising a carrier plate comprising a magnetic material, a substantially planarly ground insulating buffer layer on a surface of said plate, and a semiconductor layer on said buffer layer. The magnetic material is selected from the group consisting of ferromagnetic and ferritic materials. The buffer layer comprises a synthetic resin bondable to the magnetic material and having a filler therein selected from the group consisting of powdered quartz, aluminum oxide and magnesium oxide. The semiconductor layer comprises an $A^{III}B^{V}$ material.

Figure 1:
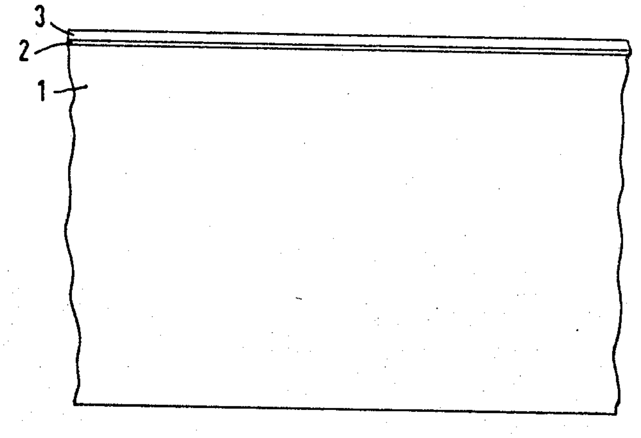

My invention relates to galvano-magnetic resistors. More particularly, it relates to such resistors comprising a galvano-magnetic semiconductor material.

Several known embodiments of magnetic field probes comprising galvano-semiconductor material are in existence at this time. Such probe should, preferably, be of the least possible thickness in order that the resistance thereof be as great as possible and in order that the air gap into which it is inserted in a magnetic circuit may be made as narrow as is possible. In order to obtain advantageous operational characteristics in such probes, also known as field plates, the thickness of the semiconducting layer therein has to be greatly reduced, i.e., to a value of 5 microns and less thereof.

Because extremely thin semiconductor plates cannot by themselves be readily handled during their actual application, they are laid on a relatively thick base, a so-called carrier plate, to provide a structure having stability and sufficient thickness to enable the facile handling thereof. In order to enable the maintaining of a relatively small effective air gap in spite of the use of a relatively thick carrier plate, it has been attempted to employ carriers which comprise a ferromagnetic material or ferrite. Where such material or ferrite is employed as the carrier plate material, it has generally been found necessary to insulate electrically the semiconductor layer from the carrier plate, thin mica plates being the insulating material most commonly used for such purpose.

Since the material comprising the carrier plate, the semi-conductor layer and the insulating layer disposed therebetween all generally have different coefficients of expansion, such known composite structures, i.e., known galvano-magnetic field plates may be damaged and may even be cracked at elevated temperatures. In addition, the insulating layer which, because of its nonmagnetic properties, of necessity, contributes toward the enlargement of the effective air gap and has not been able to be produced in as small a thickness as desired in situations where a very strong magnetic field and, concomitantly, a very narrow air gap is required.

Accordingly, it is an important object of this invention to provide a galvano-magnetic resistor comprising a plate which is a sandwich of a semiconductor layer, an insulating layer and a carrier plate comprising a ferromagnetic or ferritic material in which the disadvantages of known galvano-magnetic field plates as outlined hereinabove are substantially eliminated.

This object is achieved by providing a galvano-magnetic plate in which an insulating buffer layer is applied to the surface of a ground carrier plate opposing the semiconductor layer. This buffer layer is relatively soft as compared to the hardness of the semiconductor layer and the material constituting the carrier plate may suitably comprise a synthetic resin containing a filler material such as powdered quartz, aluminum oxide or magnesium oxide. In addition to its insulating function, such buffer layer functions to fill in and thereby even out any surface roughness on the carrier plate.

The field plate produced in accordance with the invention is not deleteriously affected by temperature fluctuations since the buffer layer may be quite precisely ground to a thinness as low as 1 micron and because it is relatively soft as compared to the hardness of the carrier and semiconductor materials. Consequently, differing coefficients of expansion of carrier plate and semiconductor layer materials which might possibly occur during temperature fluctuations, may be compensated for across the buffer layer. Thus, the invention enables a choice of semiconductor materials for application to metal or other suitable operative materials without the need for considering to any great extent, their expansion coefficients.

Thus, in accordance with the invention, the employing of a magnetic material, i.e., a ferromagnetic or a ferritic material for the carrier plate, enables the reduction of the air gap in the magnetic circuit to a width of, at most, a few microns in excess of the thickness of the semiconductor layer. Accordingly, the width of the air gap may essentially be reduced to the thickness of the buffer layer and the semiconductor.

In an embodiment of a method for producing the galvano-magnetic resistance in accordance with the invention, a buffer layer, as mentioned hereinabove, is spread in the liquid state, at a thickness of about 10 microns upon a pre-ground carrier plate. Thereafter, the buffer layer is permitted to harden and is then ground down to a thickness of about 5 microns. The semiconductor layer is then applied to the finished carrier plate. Alternatively, the applied buffer layer has a thickness of about 5 microns and, after its hardening, is ground to a thickness of about 1 micron. Of course, thicknesses intermediate the aforestated values may be chosen for the applied and ground down buffer layers respectively.

Generally speaking and in accordance with the invention, there is provided a galvano-magnetic resistor comprising a carrier plate comprising a magnetic material, a substantially planarly ground insulating buffer layer on a surface of the carrier plate, and a semiconductor layer on the buffer layer.

Also in accordance with the invention, there is provided a method for producing a galvano-magnetic resistor comprising spreading in the liquid state on a pre-ground surface of a carrier plate comprising a magnetic material, a buffer layer having a thickness of about 5 to 10 microns, the buffer layer comprising a relatively soft insulating material, permitting the buffer layer to harden, planarly grinding the hardened buffer layer to a thickness of about 1 to 5 microns, and thereafter applying a layer of semiconductor material to the buffer layer.

The foregoing and more specific objects and features of my invention will be apparent from, and will be mentioned in the following description of a galvano-magnetic resistor taken together with the accompanying drawing.

Figure 2:
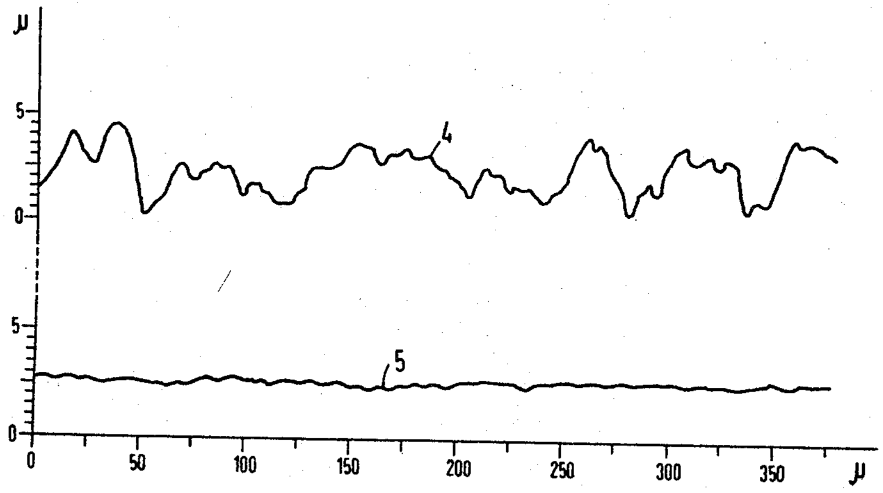

In the drawing, FIG. 1 is a schematic depiction of an illustrative embodiment of a galvano-magnetic resistor constructed in accordance with the principles of the invention; and FIG. 2 shows curves which represent the quality of the carrier plate surface relative the absence and presence of the buffer layer provided according to the invention.

Referring now to FIG. 1 wherein there is shown an illustrative embodiment of a galvano-magnetic field plate constructed in accordance with the principles of the invention, the layer 1 is the carrier layer which comprises the magnetic material, the layer 2 is the layer which comprises the buffer material and the layer 3 is the layer which comprises the semiconductor material.

In order to reduce the effective width of the air gap of the magnetic circuit into which the galvano-magnetic field plate shown in FIG. 1 is inserted during operation, carrier plate 1 preferably comprises a relatively soft magnetic material. Magnetic materials suitable for this purpose may, for example, be mu-metal or "electrical sheets," the latter being a silicon steel. In particular situations such as where it is desired to have a linear dependence of the galvano-magnetic resistance upon the excitation of the electromagnet substantially throughout the entire range from the lowest to the highest amount of available ampere turns, it may be desirable to have a carrier assembly which comprises entirely or partly a ferrite having a saturation considerably lower than that of the magnetic core in the magnetic circuit in which the resistor is utilized. Such situation and a ferritic carrier plate suitable therefor are disclosed in the U.S. patent application of Herbert Weiss for "Galvano-magnetic Semiconductor Device," Serial No. 412,078, filed Nov. 18, 1964, now Patent No. 3,315,204, and assigned to the assignee of this invention.

Semiconductor layer 3 of the galvano-magnetic field plate desirably should have the strongest galvano-magnetic resistance which is possible. There are many known materials whose resistance increases from 0 to 10 kilogauss in response to changes in the acting magnetic field, i.e., a more than tenfold value change. Suitable semiconductor materials for this purpose are, among others, the called $A^{III}B^{V}$ materials such as indium antimonide, indium arsenide, gallium arsenide, etc., of the III and V Groups respectively of the Periodic Table of elements.

It has been found that a particularly strong galvano-magnetic response may be obtained if, for example, a III–V semiconductor layer material such as indium antimonide has included therein needle-shaped bodies of a material such as nickel antimonide, aligned in parallel to each other. Alternatively, parallel aligned strips of a good conducting material such as silver, copper or indium may be included in the semiconductor layer. It has been found, in this connection, that the strongest galvano-magnetic response is obtained for a semiconductor layer if the parallel aligned strips or needles included therein, the active magnetic field and the electric current flowing through the semiconductor are respectively aligned perpendicularly to each other.

In FIG. 2, there are shown curves which reflect measurements taken of an example of an embodiment of a galvano-magnetic field plate constructed according to the invention during its production. In this figure, curves are depicted which respectively pertain to the surface quality of a ground carrier plate made of metal and of a carrier plate which is provided with a planarly ground down buffer layer. With regard to the curves, the carrier plate is depicted prior to the application thereto of the semiconductor layer.

In FIG. 2, the abscissa lies parallel to the surface of the carrier plate and the ordinates are disposed perpendicularly to the latter surface; curve 4 results from the measurement of a ground plate comprising mu-metal whose surface finish is produced with corundum grinding wheels and curve 5 results from the measurement of a mu-metal plate to which there has been applied a substantially planarly ground buffer layer, such grinding being suitably achieved by the fine grinding of the buffer layer surface with diamond grinding wheels. Both the abscissa and the ordinates in curves 4 and 5 are in micron units.

As seen in curve 4 of FIG. 2, the surface of the mu-metal plate, although ground, shows height fluctuations up to 4 microns. Such relative roughness is desirable in order to ensure the provison of a large contact area between the surface of the carrier plate and the buffer layer. Accordingly, it is advantageous to employ a material for the production of the buffer layer whose coarseness, i.e. grain size, is much smaller than the roughness depth of the preground carrier plate.

A suitable example of a material for buffer layer 2 is one prepared as follows: An epoxy resin is mixed with aluminum oxide ($Al_2O_3$) powder in a ratio of parts by weight of about 3:2. The aforesaid resin functions as a binder for the aluminum oxide powder which suitably comprises grains having a size of about 0.3$\mu$ if the roughness depth of the carrier plate is about 0.5$\mu$. Aluminum oxide ($Al_2O_3$) has about the same coefficient of expansion as has the semiconductor material comprising semiconductor layer 3.

It will be obvious to those skilled in the art upon studying this disclosure that galvano-magnetic resistors according to my invention permit of a great variety of modifications and hence can be given embodiments other than those particularly illustrated and described herein without departing from the essential features of my invention and within the scope of the claims annexed hereto.

I claim:

1. A galvano-magnetic resistor comprising a carrier plate comprising a magnetic material, a substantially planarly ground insulating buffer layer on a surface of said plate, and a semiconductor layer on said buffer layer, said magnetic material being selected from the group consisting of ferromagnetic and ferritic materials, said buffer layer comprising a synthetic resin bondable to the magnetic material, and having a filler therein selected from the group consisting of powdered quartz, aluminum oxide and magnesium oxide, and said semiconductor layer comprising an $A^{III}B^{V}$ material.

2. The galvano-magnetic resistor as defined in claim 1, wherein the synthetic resin is an epoxy resin.

3. A galvano-magnetic resistor as defined in claim 1 wherein said buffer layer has a thickness of about 1 to 5 microns.

4. A galvano-magnetic resistor as defined in claim 3 wherein there is included in said semiconductor layer parallel aligned needle-shaped bodies of nickel antimonide.

5. A galvano-magnetic resistor as defined in claim 3 wherein there is included in said semiconductor layer parallel aligned strips of a conductive material.

6. A galvano-magnetic resistor as defined in claim 5 wherein said carrier plate comprises mu-metal, wherein said conductive material is selected from the group consisting of silver, copper, and indium, and wherein said semiconductor layer comprises indium antimonide.

References Cited

UNITED STATES PATENTS

| | | | |
|---|---|---|---|
| 3,315,204 | 4/1967 | Weiss | 338—32 |
| 3,312,572 | 4/1967 | Norton et al. | |
| 3,288,633 | 11/1966 | Kubo | 117—75 X |
| 3,240,625 | 3/1966 | Collins | 338—308 X |
| 2,649,569 | 8/1953 | Pearson | 338—32 X |

ALFRED L. LEAVITT, *Primary Examiner.*

A. M. GRIMALDI, *Assistant Examiner.*